US011783180B1

(12) United States Patent
Ogale et al.

(10) Patent No.: US 11,783,180 B1
(45) Date of Patent: Oct. 10, 2023

(54) OBJECT DETECTION NEURAL NETWORK

(71) Applicant: Waymo LLC, Mountain View, CA (US)

(72) Inventors: Abhijit Ogale, Sunnyvale, CA (US); Alexander Krizhevsky, Mountain View, CA (US); Wan-Yen Lo, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 563 days.

(21) Appl. No.: 16/983,957

(22) Filed: Aug. 3, 2020

Related U.S. Application Data

(63) Continuation of application No. 15/378,845, filed on Dec. 14, 2016, now Pat. No. 10,733,506.

(51) Int. Cl.
*G06N 3/04* (2023.01)
*G06N 3/08* (2023.01)
*G05D 1/00* (2006.01)
*G06N 7/01* (2023.01)

(52) U.S. Cl.
CPC ............. *G06N 3/08* (2013.01); *G05D 1/0088* (2013.01); *G06N 3/04* (2013.01); *G06N 7/01* (2023.01)

(58) Field of Classification Search
CPC .......... G06N 3/04; G06N 3/0464; G06N 3/08; G05D 1/0212
See application file for complete search history.

(56) References Cited

U.S. PATENT DOCUMENTS

| | | |
|---|---|---|
| 5,239,594 A | 8/1993 | Yoda |
| 5,311,600 A | 5/1994 | Aghajan et al. |
| 5,487,133 A | 1/1996 | Park et al. |
| 5,640,468 A | 6/1997 | Hsu |
| 5,835,901 A | 11/1998 | Duvoisin, III et al. |
| 5,850,470 A | 12/1998 | Kung et al. |
| 6,092,059 A | 7/2000 | Straforini et al. |
| 6,404,920 B1 | 6/2002 | Hsu |
| 6,829,384 B2 | 12/2004 | Schneiderman et al. |

(Continued)

OTHER PUBLICATIONS

Chen et al., "Deepdriving: Learning affordance for direct perception in autonomous driving," Proceedings of the IEEE International Conference on Computer Vision, 2015, pp. 2722-2730.

(Continued)

*Primary Examiner* — Hal Schnee
(74) *Attorney, Agent, or Firm* — McDonnell Boehnen Hulbert & Berghoff LLP

(57) ABSTRACT

Methods, systems, and apparatus, including computer programs encoded on computer storage media, for generating object predictions using a neural network. One of the methods includes receiving respective projections of a plurality of channels of input sensor data, wherein each channel of input sensor data represents different respective characteristics of electromagnetic radiation reflected off of one or more objects. Each of the projections of the plurality of channels of input sensor data are provided to a neural network subsystem trained to receive projections of input sensor data as input and to provide an object prediction as an output. At the output of the neural network subsystem, an object prediction that predicts a region of space that is likely to be occupied by an object is received.

20 Claims, 10 Drawing Sheets

(56) References Cited

U.S. PATENT DOCUMENTS

| | | |
|---|---|---|
| 7,099,510 B2 | 8/2006 | Jones et al. |
| 7,194,114 B2 | 3/2007 | Schneiderman |
| 7,197,186 B2 | 3/2007 | Jones et al. |
| 7,227,893 B1 | 6/2007 | Srinivasa et al. |
| 7,386,527 B2 | 6/2008 | Harris et al. |
| 7,848,566 B2 | 12/2010 | Schneiderman |
| 8,649,932 B2 | 2/2014 | Mian et al. |
| 9,229,102 B1 | 1/2016 | Wright et al. |
| 9,275,308 B2 | 3/2016 | Szegedy et al. |
| 9,760,806 B1 | 9/2017 | Ning et al. |
| 9,989,967 B2 | 6/2018 | Jacobus et al. |
| 10,330,787 B2 | 6/2019 | Melvin et al. |
| 10,345,822 B1 * | 7/2019 | Parchami ............. G05D 1/0251 |
| 2005/0013486 A1 | 1/2005 | Wiedemann et al. |
| 2010/0100275 A1 | 4/2010 | Mian et al. |
| 2010/0111396 A1 | 5/2010 | Boucheron |
| 2010/0169009 A1 | 7/2010 | Breed et al. |
| 2012/0050021 A1 | 3/2012 | Rao et al. |
| 2012/0300078 A1 | 11/2012 | Ogata et al. |
| 2013/0250112 A1 | 9/2013 | Breed |
| 2014/0210644 A1 | 7/2014 | Breed |
| 2015/0055821 A1 | 2/2015 | Fotland |
| 2017/0140247 A1 | 5/2017 | Yoo et al. |
| 2017/0357894 A1 | 12/2017 | Bainville et al. |
| 2018/0061059 A1 | 3/2018 | Xu et al. |
| 2018/0068206 A1 | 3/2018 | Pollach et al. |
| 2018/0107215 A1 | 4/2018 | Djuric et al. |
| 2018/0157386 A1 | 6/2018 | Su |
| 2019/0169962 A1 | 6/2019 | Aqrawi et al. |

OTHER PUBLICATIONS

Huval et al., "An Empirical Evaluation of Deep Learning on Highway Driving," arXiv:1504.01716v3, Apr. 17, 2015, 7 pages.

princeton.edu [online]. "Deep Learning for Self-driving Car," [retrieved Dec. 21, 2016] Retrieved from internet: URL<http://www.princeton.edu/~alaink/Orf467F14/Deep%20Driving.pdf> 32 pages.

Pomerleau, Dean A., "Neural network vision for robot driving," The Handbook of Brain Theory and Neural Networks, 1996, 22 pages.

Rivals et al., "Real-Time control of an autonomous vehicle: a neural network approach to the path following problem," 5th International Conference on Neural Networks and their Application, 1993, 11 pages.

Szarvas et al., "Real-time Pedestrian Detection Using LIDAR and Convolutional Neural Networks," Intelligent Vehicles Symposium 2006, Toyko, Japan, Jun. 13-15, 2006, 6 pages.

\* cited by examiner

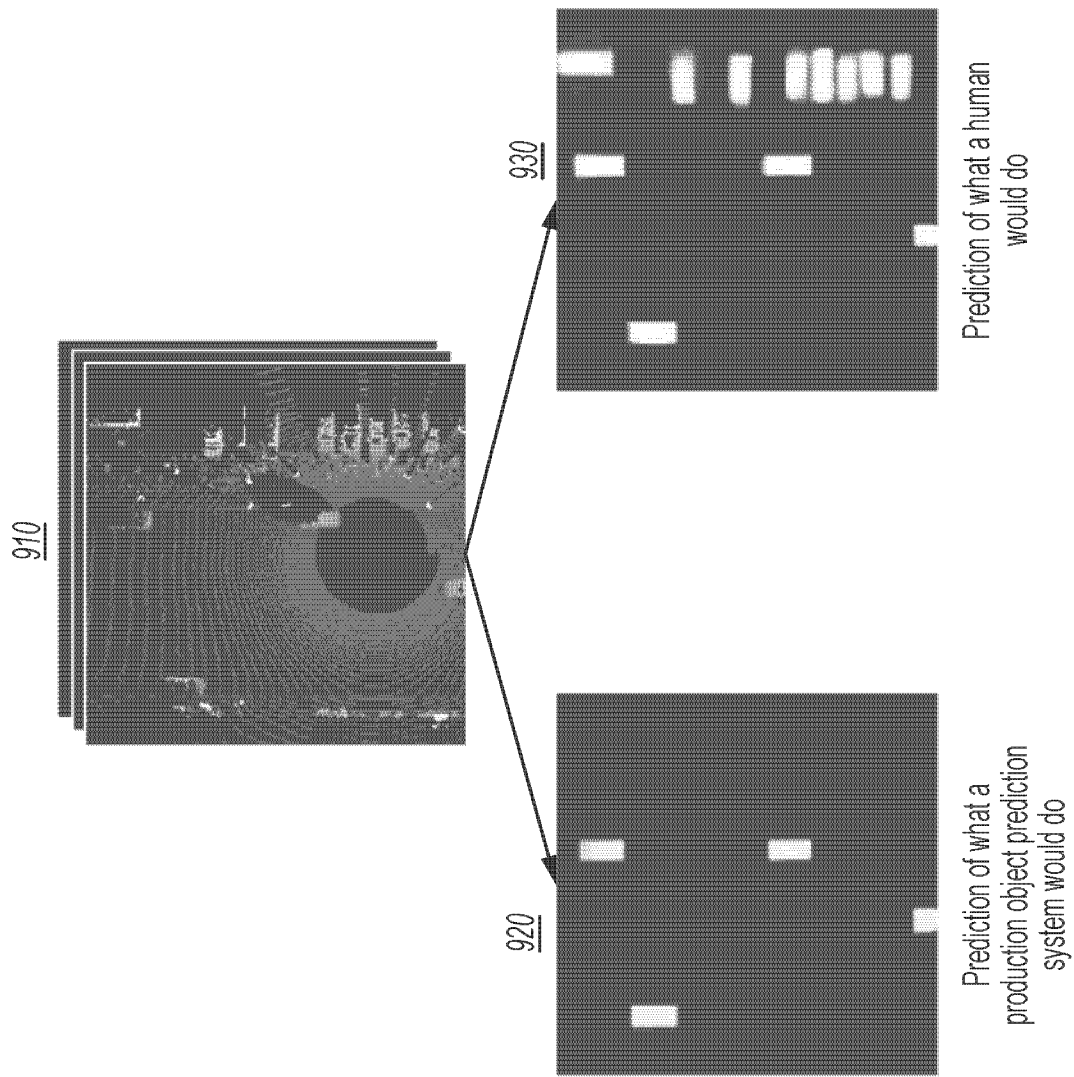

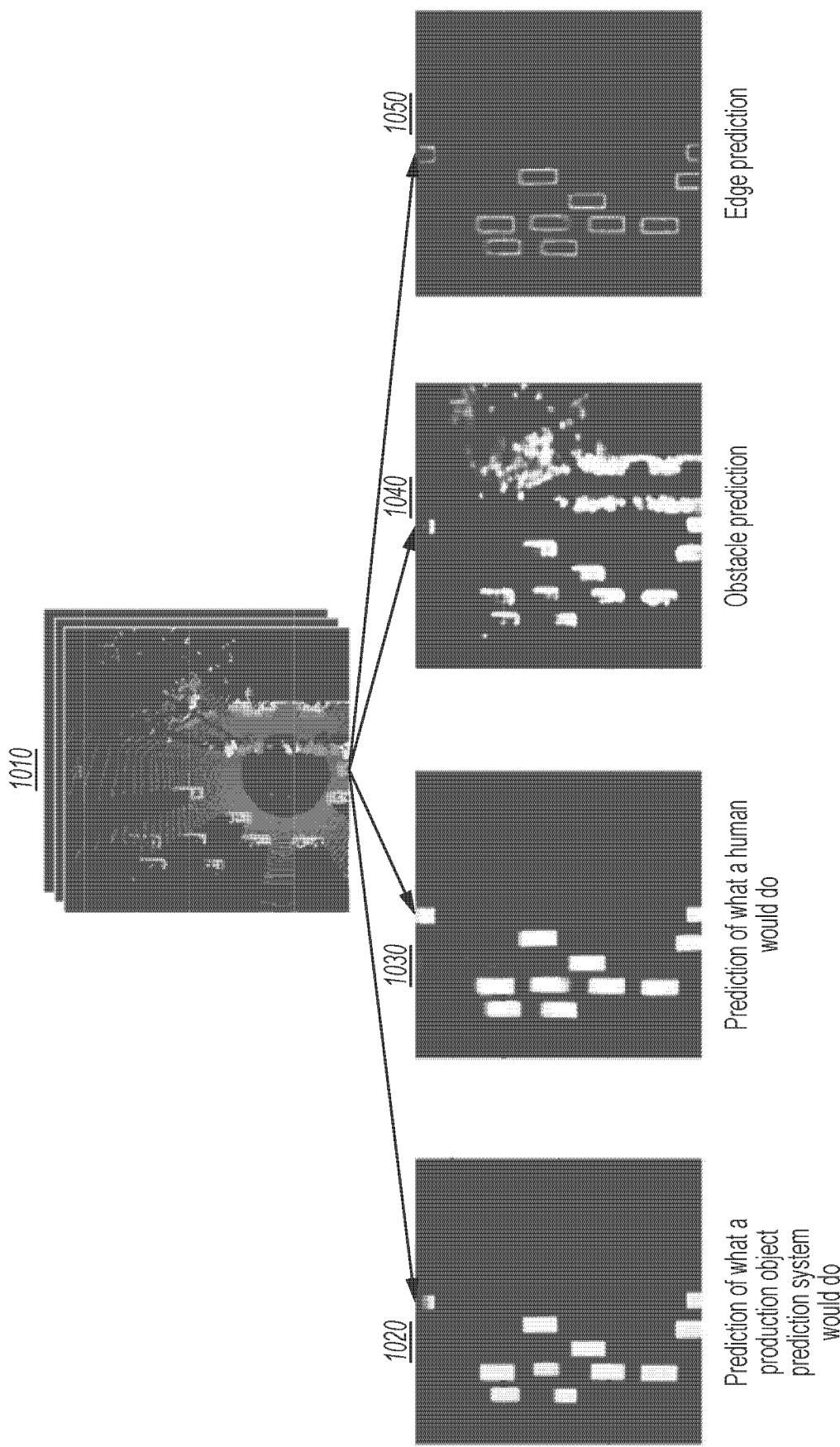

OBJECT DETECTION NEURAL NETWORK

CROSS-REFERENCE TO RELATED APPLICATION

This is a continuation of U.S. application Ser. No. 15/378,845, filed on Dec. 14, 2016, the disclosure of which is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes how a computer system can implement a fully-learned neural network to make object predictions from projections of input sensor data. In other words, the system can make accurate object predictions from projections of raw sensor data without using human-programmed logic about how the sensor data should be combined or analyzed.

In general, one innovative aspect of the subject matter described in this specification can be embodied in methods that include the actions of receiving respective projections of a plurality of channels of input sensor data, wherein each channel of input sensor data represents different respective characteristics of electromagnetic radiation reflected off of one or more objects; providing each of the projections of the plurality of channels of input sensor data to a neural network subsystem trained to receive projections of input sensor data as input and to provide an object prediction as an output; and receiving, at the output of the neural network subsystem, an object prediction that predicts a region of space that is likely to be occupied by an object. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The object prediction predicts the object to occupy a region of space that is unobservable from any of one or more sensors that generated the input sensor data. The actions include receiving, from one or more on-board sensors of a vehicle, the plurality of channels of input sensor data; and generating the respective projections from the plurality of channels of input sensor data. Each respective projection of input sensor data comprises a top-down projection of a respective characteristic of the electromagnetic radiation reflected off of one or more objects. Each top-down projection is a top-down projection of an area surrounding a vehicle. The neural network generates a score for each element of a projection plane, wherein the score represents a likelihood that the element corresponds to space occupied by an object. The object predictions are represented by respective color values for each pixel in an output image. Receiving respective projections of a plurality of channels of input sensor data comprises receiving respective projections for multiple time slices for each channel of input sensor data. The actions include providing a road graph as input to the neural network, wherein the road graph indicates the locations of road lanes relative to a location of the vehicle. The plurality of channels of sensor data include one or more of a height channel, a reflection intensity channel, a second return channel, and an elongation channel. The neural network comprises: a plurality of input layers corresponding respectively to the plurality of channels of input sensor data; a plurality of convolutional layers; and one or more output layers. The neural network comprises a plurality of output layers, each output layer generating a different respective prediction from the projections of input sensor data. The plurality of output layers includes: a human-labeled output layer that predicts how a human would identify objects in the projections of input sensor data; and an auto-labeled output layer that predicts how an on-board system would identify objects in the projections of input sensor data. The actions include training the network using different respective collections of training data for the human-labeled output layer and the auto-labeled output layer. The actions include training the neural network using both a collection of human-labeled training data for the human-labeled output layer, a collection of auto-labeled training data for the auto-labeled output layer; and providing only the output of the human-labeled output layer to a planning subsystem of the vehicle. The plurality of output layers includes one or more auxiliary output layers. The one or more auxiliary output layers includes one or more of an edge detection output layer, a visible object parts output layer, or an obstacle output layer. The neural network comprises: a space-to-depth layer that stacks groupings of two-dimensional input tensors into multiple three-dimensional depth slices; and a corresponding depth-to-space output layer for each of the one or more output layer. The actions include systematically altering or dropping one or more projections for the plurality of channels of input sensor data.

Particular embodiments of the subject matter described in this specification can be implemented so as to realize one or more of the following advantages. An autonomous or semi-autonomous vehicle system can use a fully-trained neural network subsystem to make object predictions. The neural network can use raw sensor data as input, which can reduce the risk of failures that occur in traditional, heuristic-based approaches. The system can predict the occluded parts of objects in when the object is highly occluded. This can be used to predict the full shape of vehicles even though the sensor input data contains only reflections from some parts of the vehicle. The system can use co-training techniques to improve the accuracy of the predictions. Co-training allows the system to combine the benefits of highly-accurate, but limited human-labeled data with less-accurate, but more voluminous auto-labeled data. The system can make the predictions robust to sensor failure or adverse weather conditions by systematically altering the training data during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 illustrates predictions for both human-labeled and auto-labeled training data.

FIG. 10 illustrates predictions for human-labeled training data, auto-labeled training data, and auxiliary training data.

Like reference numbers and designations in the various drawings indicate like elements.

DETAILED DESCRIPTION

This specification describes how a vehicle, e.g., an autonomous or semi-autonomous vehicle, can use a fully-learned neural network to make object predictions from projections of multiple channels of input sensor data. Each object prediction specifies a region of space that is likely to be occupied by an object. The neural network can be trained to detect any appropriate object class, including vehicles, pedestrians, bicyclists, or lane markers, to name just a few examples.

As used in this description, a "fully-learned" machine learning model is a model that is trained to compute a desired prediction. In other words, a fully-learned model generates an output based solely on training data rather than on human-programmed decision logic.

Figure 1:
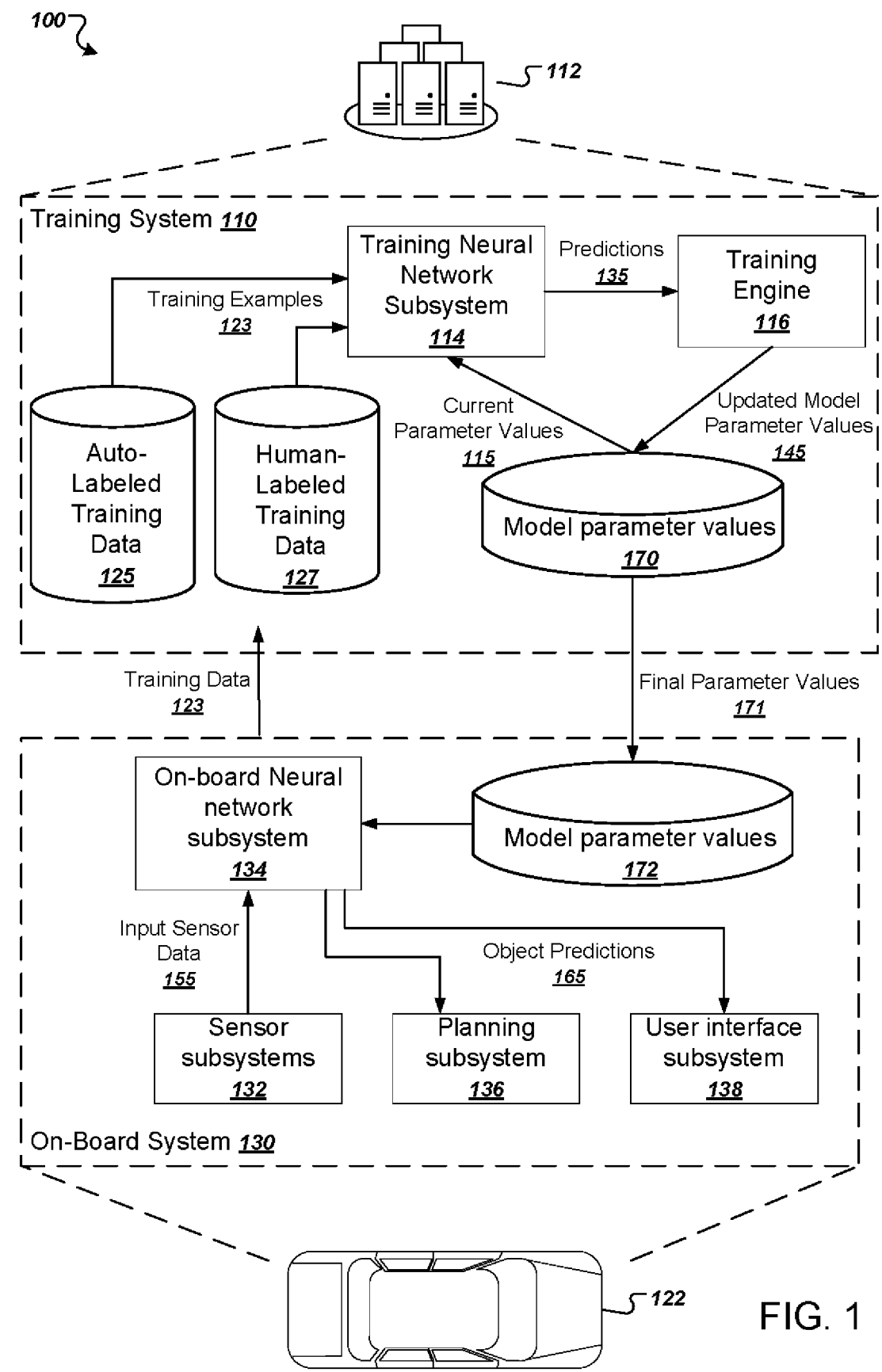
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses object predictions to inform fully-autonomous driving decisions. The vehicle 122 can also be a semi-autonomous vehicle that uses object predictions to aid a human driver. For example, the vehicle 122 can autonomously apply the brakes if an object prediction indicates that a human driver is about to collide with another vehicle.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 provide input sensor data 155 to an on-board neural network subsystem 134. The input sensor data 155 can include multiple channels of data, where each channel represents a different characteristic of reflected electromagnetic radiation. Thus, multiple channels of input sensor data 155 can be generated from measurements from the same sensor.

The sensor-subsystems 132, or the on-board neural network subsystem 134, or some combination of both, transform raw sensor data into the multiple channels of input sensor data 155. To do so, the on-board system 120 can project the various characteristics of the raw sensor data into a common coordinate system. The various characteristics of the raw sensor data, and their respective representations, will be discussed in more detail below with reference to FIG. 3.

The on-board neural network subsystem 134 implements the operations of each layer of a neural network trained to make object predictions. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses the input sensor data 155 to generate one or more object predictions 165. Each object prediction represents a region of the environment surrounding the vehicle 122 that is likely to be occupied by an object of a particular class, e.g., a nearby vehicle. The on-board neural network subsystem 134 can provide the one or more object predictions 165 to a planning subsystem 136, a user interface subsystem 138, or both.

When a planning subsystem 136 receives the one or more object predictions 165, the planning subsystem 136 can use the one or more object predictions 165 to make fully-autonomous or semi-autonomous driving decisions. For example, the planning subsystem 136 can generate a fully-autonomous plan to navigate through or around other vehicles on a highway. As another example, the planning subsystem 136 can generate a semi-autonomous recommendation for a human driver to apply the brakes.

A user interface subsystem 138 can receive the object predictions 165 and can generate a user interface presentation that indicates the locations of nearby objects, e.g., nearby vehicles. For example, the user interface subsystem 138 can generate a user interface presentation having image or video data containing a representation of the regions of space that are likely to be occupied by vehicles. An on-board display device can then display the user interface presentation for passengers of the vehicle 122.

The on-board neural network subsystem 134 can also use the input sensor data 155 to generate training data 123. The training data 123 can include the projected representations of the different channels of input sensor data. The on-board system 130 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make object predictions from input sensor data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can include auto-labeled training data 125, human-labeled training data 127, or some combination of the two. Each of the training examples 123 includes a representation of the different channels of input sensor data as well as one or more labels that indicate the location of objects within regions of space represented by the input sensor data.

The human-labeled training data 127 includes human-provided labels for each training example. Each label can be a human-drawn bounding box that indicates the locations of each object in the training example.

The auto-labeled training data 125 includes machine-predicted labels for each training example. The training system can obtain the auto-labeled training data 125 by using other object prediction systems, e.g., ones that use human-programmed logic to make object predictions.

Human-labeled training data 127 tends to be more accurate than the auto-labeled training data, but human-labeled training data 127 is generally more expensive to obtain because human participants are required. In contrast, the auto-labeled training data 125 tends to be cheaper to obtain than human-labeled training data 127, but the training system 110 can more easily obtain large amounts of it.

In some implementations, the training system 110 can utilize the advantages of both auto-labeled training data 125 and human-labeled training data 127 using co-training techniques. This is described in more detail below with reference to FIG. 7.

The training neural network subsystem 114 can generate, for each training example 123, one or more object predictions 135. A training engine 116 analyzes the object predictions 135 and compares the object predictions to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
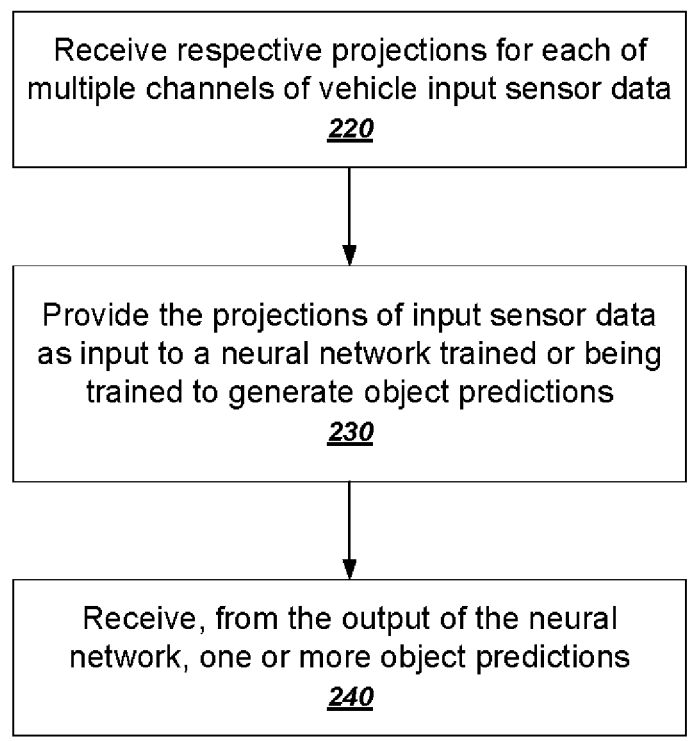
FIG. 2 is a flow chart of an example process for computing an object prediction from projections of input sensor data.

FIG. 2 is a flow chart of an example process for computing an object prediction from projections of input sensor data. The example process in FIG. 2 uses a forward inference pass through a neural network trained or being trained to make object predictions. The example process can thus be used during training or to make predictions from unlabeled input, e.g., in a production system. The process will be described as being performed by an appropriately programmed neural network system.

The system receives projections for each of multiple channels of vehicle input sensor data (210). In general, each channel of input sensor data represents a different characteristic of electromagnetic radiation reflected off of one or more nearby objects.

A first example channel is a height channel. The height channel records, for each of one or more directions, a distance of the tallest object that reflected at least some electromagnetic radiation back to the vehicle. The system can compute the height channel from one or more input sensor data intensities at respective azimuth values in a particular direction. For example, if a tall bus and a short car are on the same line of sight from a vehicle sensor, the height channel can indicate, for that line of sight, the distance to the bus and not the distance to the car. Thus, the height channel typically records only a single object in each direction.

A second example channel is an intensity channel. The intensity channel records, for each of one or more directions, a distance and a relative intensity of electromagnetic radiation reflected from objects around the vehicle. For one particular direction, the intensity channel can record multiple objects having different respective intensities. The intensity channel provides a strong signal for objects that are highly reflective, e.g., lane markers and nearby vehicles.

A third example channel is a second return channel. The second return channel records, for each of one or more directions, a distance and an intensity for instances in which a second reflection was received for a single pulse. The second return channel provides a strong signal for translucent phenomena, e.g., fog, car exhaust, and rain.

A fourth example channel is an elongation channel. The elongation channel records, for each of one or more directions, distances of many reflections for a single pulse, e.g., more than a threshold number of reflections for a single pulse. The elongation channel thus represents instances in which the pulse was spread through a highly diffuse object, e.g., trees, bushes, and other vegetation.

The input sensor data can then be transformed into corresponding projections in a common coordinate system. In general, each projection of the raw sensor data is a mapping of the raw sensor input data onto a particular projection plane, with each location in the projection plane corresponding to a region of space around the vehicle. Each projection thus maps each distinct region of space to a particular value for the corresponding channel of input sensor data. The system can use any appropriate projection so long as all the channels of input sensor data are projected into the same coordinate system. For example, the system can use a top-down projection or a perspective projection. A top-down projection is a projection of the sensor data onto a region surrounding the vehicle from a location above the vehicle itself. The projection plane for a top-down projection is thus substantially parallel to the surface on which the vehicle is standing. A perspective projection is a projection of the sensor data onto a plane in front of, behind, or to the side of the vehicle. The system can represent each projection as a matrix of sensor input data for the channel, with each element of the matrix corresponding to a location on the projection plane. Each element of the matrix has a respective value for the characteristic of the corresponding channel. The system may, but need not, represent each projection with image data in an image format.

If the process is being performed by an on-board system, e.g., the on-board system 130 of FIG. 1, the on-board system can receive the raw input sensor data and generate the corresponding projections. If the process is being performed during training, typically the projections will already have been generated from the input sensor data by an on-board system or another system.

Figure 3:
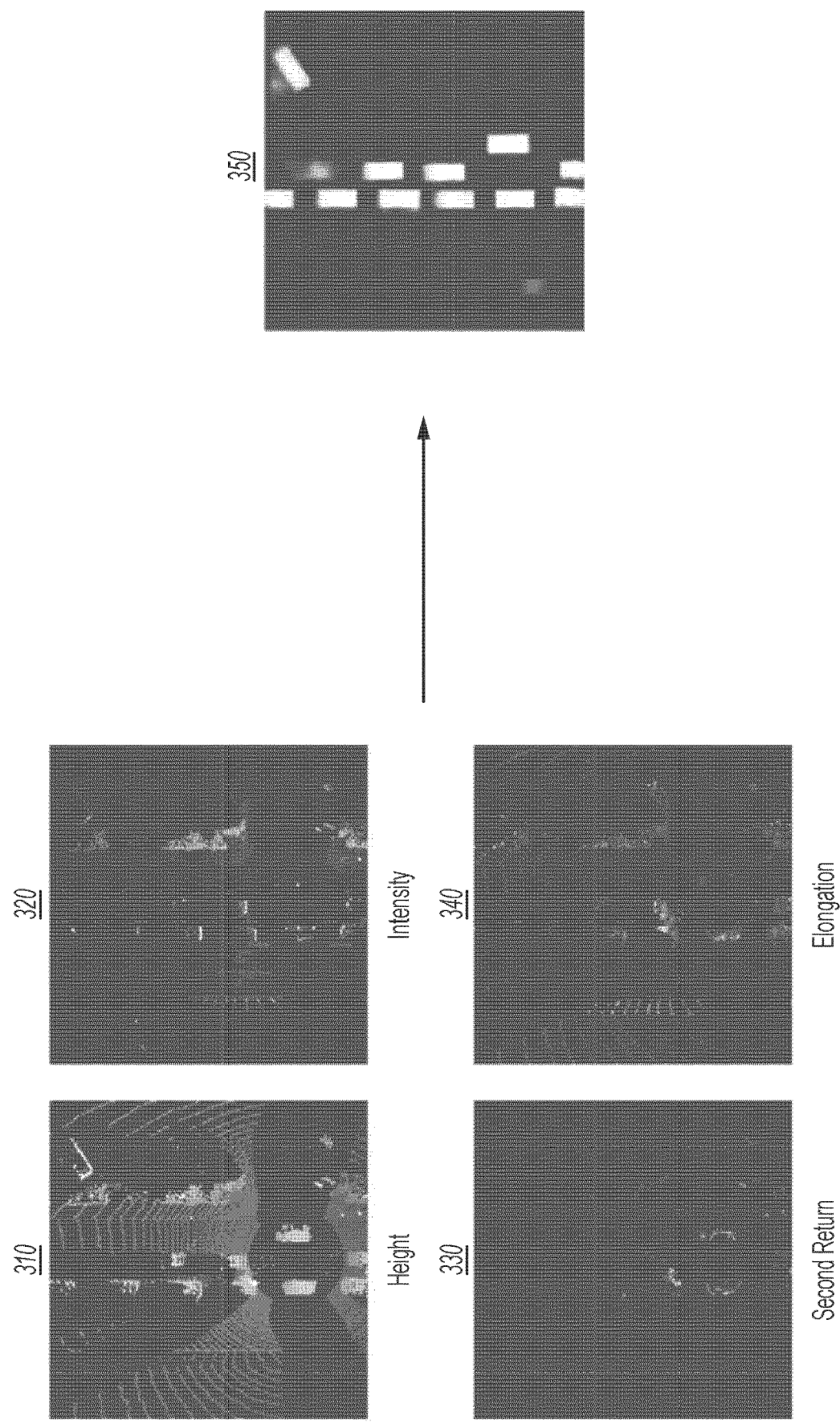
FIG. 3 illustrates top-down projections for different channels of laser input data.

FIG. 3 illustrates top-down projections for different channels of laser input data. The same or similar projections can be used for other kinds of electromagnetic radiation.

Each of the top-down projections 310, 320, 330, and 340 are projections of a different channel of input sensor data onto a plane that is substantially parallel to the road on which the vehicle is traveling. The vehicle recording the input sensor data is thus located substantially in the middle of each image.

A first top-down projection 310 is a projection of a height channel.

The top-down projection 310 indicates a distance from the vehicle for each tallest object. The intensities of the top-down projection 310 are, however, all uniform. As shown, when tall objects are near the vehicle, the top-down projection 310 of the height channel data includes large regions of empty space. In addition, the top-down projection 310 of the height channel data may include regions in which no data was recorded. In the top-down projection 310, the concentric circles and parallel lines represent regions of space that were swept by a laser, but which generated no reflections. The system can include these visual features only in user-interface presentations for clarity, and need not use them for making object predictions.

A second top-down projection 320 is a projection of an intensity channel. The top-down projection 320 indicates multiple objects for some lines of sight around the vehicle, and for each object, a distance and a relative intensity.

A third top-down projection 330 is a projection of a second return channel. The top-down projection 330 indicates a distance from the vehicle of second returns for each direction around the vehicle. In this example, the second returns are likely to be car exhaust.

A fourth top-down projection 340 is a projection of an elongation channel. The top-down projection 340 indicates lines along which many reflections were received, which are likely to be due to vegetation.

In some implementations, the system can improve the robustness of the neural network by systematically disrupting one or more of the input projections during training. For example, the system can randomly or pseudorandomly drop or alter one or more of the input projections during training. The system can uniformly distribute which of the input projections are disrupted.

By disrupting the input projections during training, the system can reduce the likelihood that the network becomes too dependent on the features of any one input channel. This provides for more accurate predictions and also makes on-board predictions safer. For example, if a particular input sensor should fail while the vehicle is driving, the on-board neural network system can still make reasonably accurate object predictions because during training it was forced to use the other sensors. This technique also makes object predictions more accurate in adverse weather conditions. For example, in heavy fog the tops of nearby vehicles may not be observable, which effectively disables the height channel. But if the network was forced during training to learn how to use the other channels to make accurate predictions, the on-board system can still make accurate predictions in heavy fog. This is true even if none of the training data reflected measurements that were actually taken in heavy fog. As a result, the on-board system can make accurate predictions in adverse weather even if the network was entirely trained using training data collected in a geographic region that lacks adverse weather conditions.

The system provides the projections of input sensor data as input to a neural network trained or being trained to generate object predictions (220). In other words, the neural network has a plurality of input layers, each input layer operating on projections for a channel of input sensor data.

In some implementations, the neural network has multiple input layers for each input channel in which the multiple input layers correspond to different time slices of the input sensor data. Thus, when processing input sensor data in real time, the system may feed a projection successively to multiple input layers for the channel at successive points in time.

The system can optionally use other projections in addition to the projections for input sensor data. For example, the system can also optionally use a road graph projection. A road graph projection indicates where vehicles are likely to be for a particular geographic location. The road graph thus generally represents the lanes of the road. To generate a road graph projection, the system can determine a location of the vehicle and generate a projection for that location that indicates the center of each lane. In some implementations, the system generates the road graph projection to have the same format as the projections of input sensor data. For example, each element of the road graph projection can indicate whether or not the location on the projection plane corresponds to the center of a road lane.

The architecture of an example neural network that is suitable for making object predictions from projections of input sensor data is described in more detail below with reference to FIG. 5.

The system receives, from the output of the neural network, one or more object predictions (230). Each object prediction specifies a region of space that is likely to be occupied by an object of a particular class. In some implementations, the object prediction indicates, for each element of a projection plane corresponding to the projection planes used by the input projections, a score representing the likelihood that the element is occupied by an object. The object predictions may, but need not be, specified in an image format, in which each pixel is indicated as corresponding or not corresponding to a region of space occupied by an object.

As illustrated in FIG. 3, the object predictions can be illustrated by an image 350 corresponding to the projection planes used for top-down projections 310, 320, 330, and 340. The image 350 includes multiple object predictions that are full-vehicle predictions. The system can assign each element of the projection plane a score representing the likelihood that the element corresponds to space occupied by a vehicle. In this example, regions with more intensity in the projection plane correspond to space that is more likely to be occupied by a vehicle. Thus, in some implementations the system can represent the full-vehicle predictions by assigning a different color value to each pixel in an output image.

After generating the object predictions, the system can take different actions depending on whether the forward inference pass is being used for training or in a production system. During training, the object predictions can be used to compute one or more errors based on the labels in the training example used. The errors can be used to compute updated weights for the neural network, which can be computed and updated using any appropriate training technique, e.g., gradient descent with backpropagation.

When used in an on-board production system, the object predictions can be provided to a planning subsystem that makes decisions about how the vehicle should react to the predicted objects.

Figure 4:
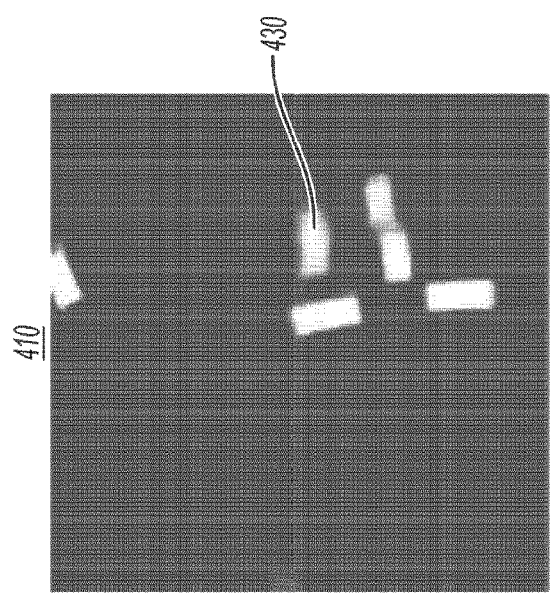
FIG. 4 illustrates an example of detecting an occluded vehicle.
Figure 4:
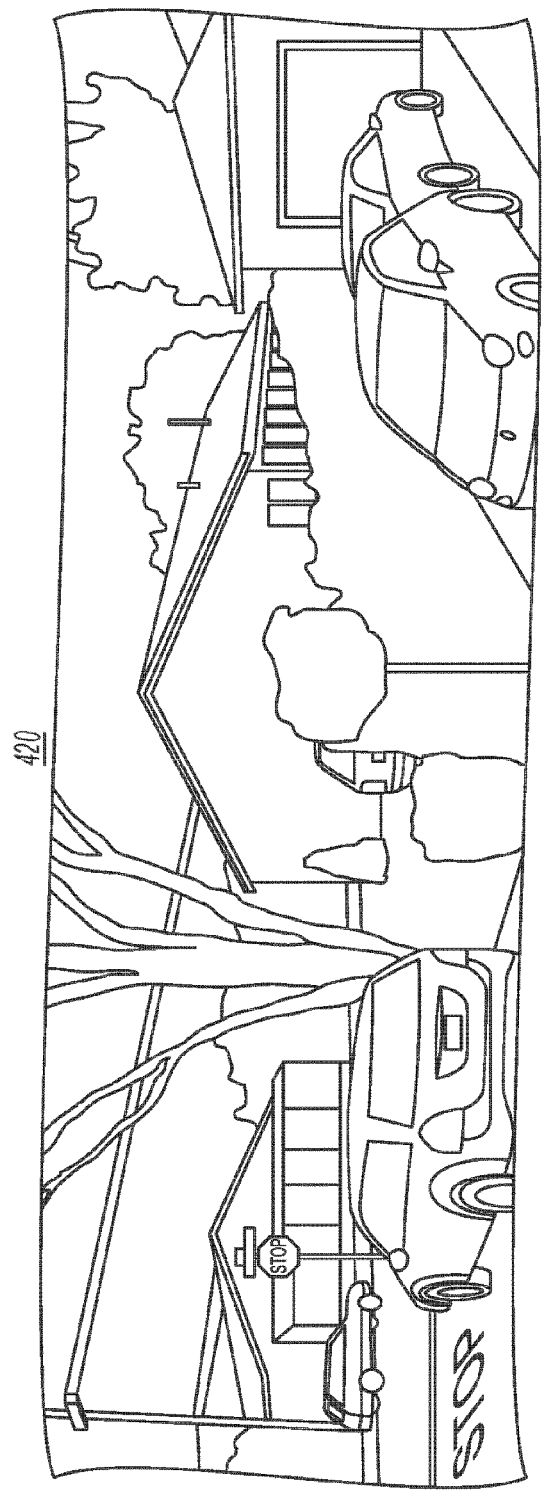

FIG. 4 illustrates an example of detecting an occluded vehicle. FIG. 4 illustrates an output image 410 of a projection plane. The image 410 indicates a number of full-vehicle predictions. FIG. 4 also illustrates a true-color camera image 420 looking forward from the vehicle.

From the camera image 420, it can be seen that a car is mostly occluded by a hedge. Nevertheless, a neural network is able to predict all regions of space occupied by the occluded vehicle. In particular, even though only a portion of the occluded car is visible, the system still predicts the full length of the car. The neural network outputs this information as a full-vehicle prediction 430 within the image 410.

Figure 5:
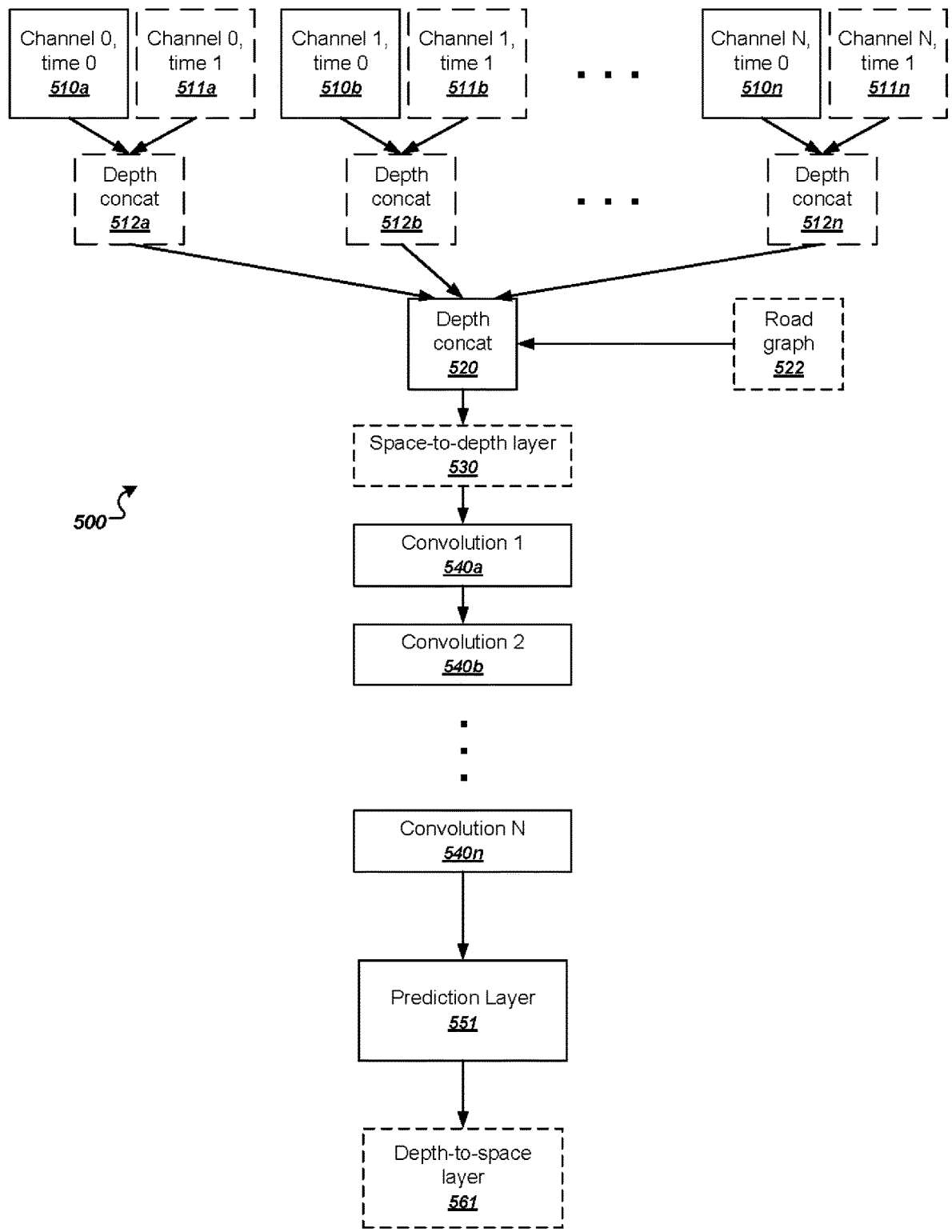
FIG. 5 illustrates an example architecture of a neural network.

FIG. 5 illustrates an example architecture of a neural network 500 for making object predictions from multiple channels of sensor input data.

The neural network 500 includes an input layer 510a, 510b, through 510n, one layer for each of multiple channels of input sensor data. Each input layer 510a-n generates or operates on a different respective projection of input sensor data, as described above. In other words, each input layer 510a-n can generate the projections from the input sensor data to generate an output, or each input layer 510a-n can merely process previously generated projections to generate an output suitable for further processing by the network 500, e.g., a transformed projection.

The neural network 500 can also include multiple input layers for different time slices of each channel of input sensor data. For example, the layers 511a, 511b, through 511n, accept different time slices of input sensor data for the channels corresponding respectively to the input layers 510a-510n. Although layers for only two time slices of each channel are illustrated in FIG. 5, the network 500 can include layers for any appropriate number of time slices for the input sensor data.

When the network 500 includes layers for different time slices, e.g., the layers 511a-n, the output of the input layers can be combined using a depth concatenation layer for each channel of input sensor data. For example, the output of input layers 510a and 511a can be combined using depth concatenation layer 512a. Similarly, the output of input layers 510a and 511b can be combined using depth concatenation layer 512b, and the output of input layers 510n and 511n can be combined using depth concatenation layer 512n.

Each depth concatenation layer takes as input one or more tensors and concatenates the input tensors in the depth dimension. This operation can be described as "stacking" the input tensors to generate a new tensor. In this example, the depth concatenation layers 512a-n each take as input one or more two-dimensional tensors and generate a three-dimensional tensor having depth layers corresponding respectively to the input two-dimensional tensors.

For example, input layers 510a and 511a can both generate a two-dimensional tensor representing a 200×200 pixel projection. The two-dimensional tensors will thus have dimensions 200×200×1. The depth concatenation layer 512 can stack these two-dimensional tensors to generate a three-dimensional tensor having dimensions 200×200×2.

Regardless of whether or not multiple time slices are used, the network 500 includes a depth concatenation layer 520 that stacks the inputs of the multiple channels of input sensor data. If time slices are used, the inputs are already three-dimensional tensors output by the depth concatenation layers 512a-n. If time slices are not used, the inputs are two-dimensional tensors and the output of the depth concatenation layer 520 is a three-dimensional tensor.

The network 500 can also optionally include a road graph layer 522 that generates a road graph projection from a road graph, as described above. The depth concatenation layer 520 can stack the output of the road graph layer 522 with the other received inputs. If multiple time slice input layers are used, the road graph layer 522 can generate a three-dimensional tensor having depth layers corresponding respectively to the time slices used for each of the input layers. For example, if two-time-slice input layers are used, the road graph layer can generate a 200×200×2 tensor.

The output tensor of the depth concatenation layer will thus have dimensions A×B×(N×M), where A and B represent the height and width respectively of each of the input projections, N represents the number of input layers, including any input from the road graph layer 522, and M represents the number of time slices.

The network 500 also optionally includes a space-to-depth layer 530. The space-to-depth layer 530 transforms the information in the input tensors by stacking groupings of two-dimensional tensor elements into multiple three-dimensional depth slices. In general, a space-to-depth layer identifies G groups of input elements in an N×M×1 input tensor and transforms the input elements into a (N/C)×(M/D)×G output tensor, where C and D are constants that represent how the groupings are related, and G is equal to C×D. When the input to the space-to-depth layer 530 already includes multiple depth slices, the system can apply the space-to-depth layer 530 to each of the depth slices.

Figure 6:
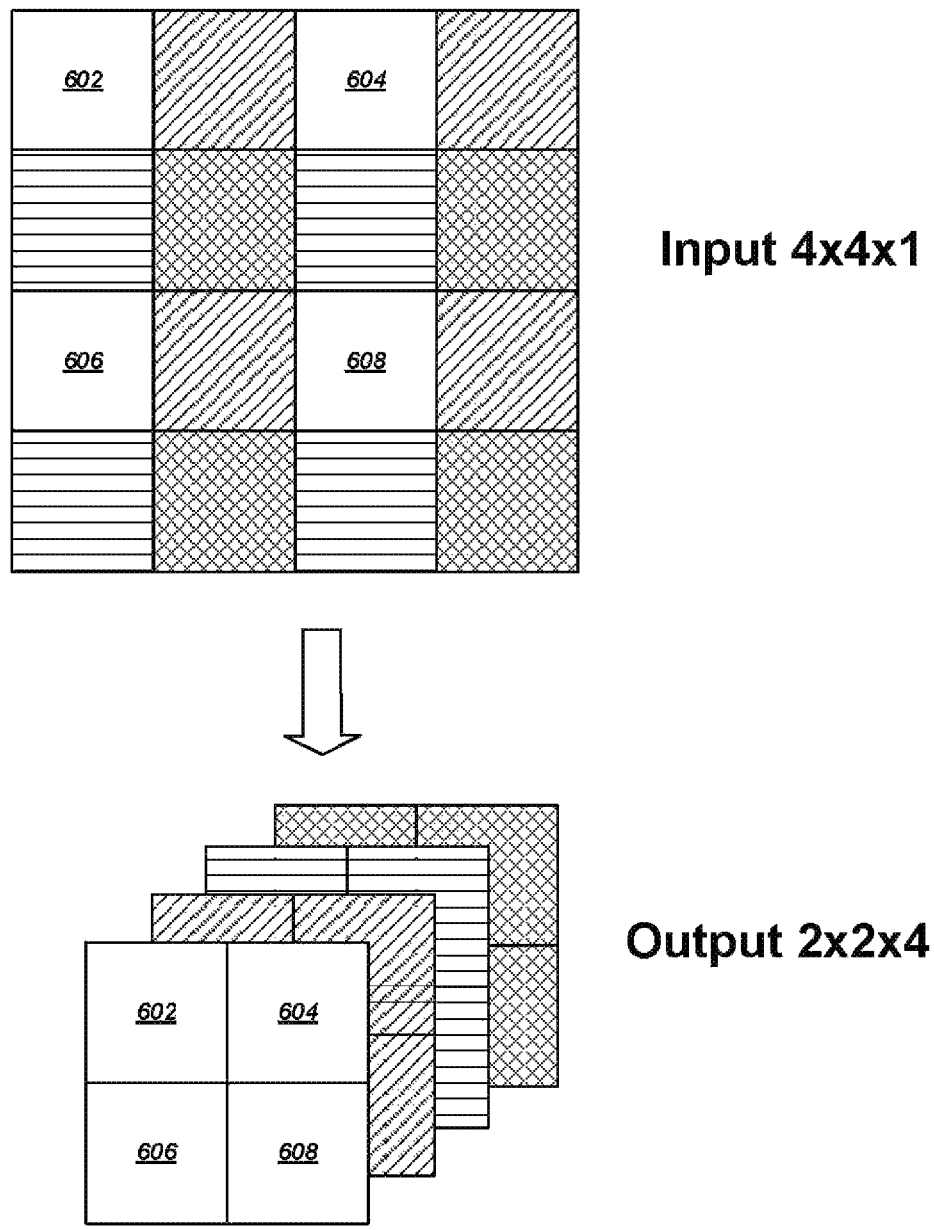
FIG. 6 illustrates an example of a space-to-depth transformation.

FIG. 6 illustrates an example of a space-to-depth transformation. The elements of a 4×4×1 input tensor can be designated as belonging to one of 4 different groups. In this example, the element groupings alternate by row and by column. Thus, elements 602, 604, 606, and 608 have been designated as belonging to the same group. However, the system can use any appropriate grouping so long as the relative spatial relationships are preserved in the output tensor.

The different fill patterns shown in FIG. 6 are for illustration purposes only. In practice, the elements are not visually distinguishable into the groups, but are rather arbitrary input data. For example, the input elements can be pixels of an arbitrary input projection.

The output of the space-to-depth transformation is a 2×2×4 output tensor. Each of the four depth slices has all of the elements of a particular grouping of input elements. The relative spatial relationships between the input elements in a group are preserved. Thus, the element 602 is to the left of the element 604 in both the input and the output tensors.

The space-to-depth layer 530 increases the effective receptive field of the input layers and compresses the spatial dimensions of the input. Each layer thus learns smaller filters, which allows a neural network system to more efficiently perform the operations of the subsequent convolutional layers without losing any precision.

As shown in FIG. 5, the network 500 includes a number of convolutional layers 540a, 540b, through 540n. Each convolutional layer has parameters whose values define the filters for the layer.

Each convolutional layer has a filter size that defines how much of the input data is processed by each neuron. The filter size of each of the convolutional layers determines the size of the final output. Thus, for a desired output size, the total receptive field across all of the convolutional layers should be roughly the size of the desired output size. For example, if there are 10 layers and each layer has a 3×3 pixel filter, the output can be a 30×30 pixel field of view. If there are 10 layers and each layer has a 5×5 pixel filter, the output can be a 50×50 pixel field of view.

The network 500 also includes a prediction layer 551 that generates an object prediction from the input data. In some implementations, the prediction layer 551 is also a convolutional layer. The object prediction is data that designates a particular region of space as a region that is likely to be occupied by an object of a particular class, e.g., a nearby vehicle or a pedestrian. In some implementations, the prediction layer 551 outputs two-dimensional projection data that is substantially the same size as the input projection data.

If the network 500 includes a space-to-depth layer 530, the network 500 can also include a corresponding depth-to-space layer 561. The depth-to-space layer 561 reverses the transformation performed by the space-to-depth layer 530 as described above with reference to FIG. 6. In other words, if the network 500 includes the space-to-depth layer 530, the prediction layer 551 outputs three-dimensional tensor data with multiple depth slices. The depth-to-space layer 561 can retransform the multiple depth slides into two-dimensional projection data.

A neural network system, e.g., training neural network subsystem 114 of FIG. 1, can train the network 500 using any appropriate training techniques with a collection of training data. In some implementations, the system uses a combination of auto-labeled and human-labeled training data to improve the performance of the network 500.

After being trained, a neural network system, e.g., the on-board neural network subsystem 134 can use the values of parameters of the trained network 500 to make object predictions in a production system.

Figure 7:
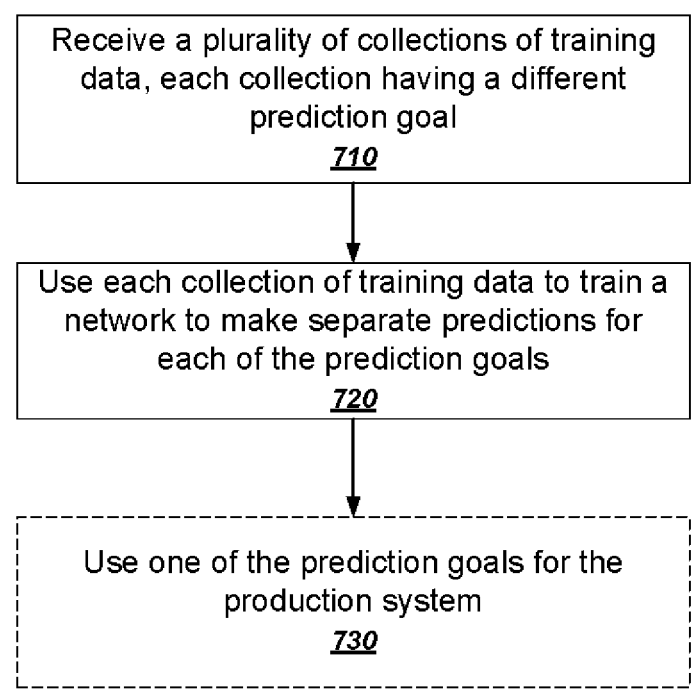
FIG. 7 is a flow chart of an example process for co-training a neural network.

FIG. 7 is a flow chart of an example process for co-training a neural network. The performance of a neural network can be substantially improved by training a single network to achieve multiple goals, each goal having separate training data. The process will be described as being performed by an appropriately programmed neural network system, e.g., the training neural network subsystem 114 of FIG. 1.

The system receives a plurality of collections of training data, each collection having a different prediction goal (710). Because the collections each respectively relate to a different prediction goal, the collections may not overlap.

However, the collections will often have prediction goals that rely on the same or similar features. For example, for training a network to make full-vehicle predictions, a system can use training collections with full-vehicle predictions as the prediction goal as well as other collections that relate to vehicle predictions but that have different prediction goals. For example, the system can use a collection of training data that has predicting vehicle edges or predicting visible parts of a vehicle as a prediction goal. All of these prediction goals will rely on learned features that are specific to vehicles, even if the eventual goal is different.

In some implementations, the system uses auto-labeled full-vehicle prediction training data as one collection of training data and human-labeled full-vehicle prediction data. This arrangement allows for the network to learn features from both (1) vast amounts of training data generated from the auto-labeled training data and (2) very high quality training data generated from human labels.

The system uses each collection of training data to train a network to make separate predictions for each of the prediction goals (720). In other words, for a particular training example from a collection of training data having a particular prediction goal, the system uses the particular training example to make a prediction for that prediction goal. The system need not compute a prediction for any other prediction goals. The system then uses the generated prediction to update the parameter values for all layers that are shared by all prediction goals. The system can use any appropriate training technique to update the parameter values, e.g., by using stochastic gradient descent with back-propagation.

For example, the system can maintain a different objective function for each prediction goal. Each objective function depends on outputs generated by a different set of layers or a different set of neurons across layers. The system can optimize each of the objective functions using stochastic gradient descent with backpropagation in order to update the values of the parameters of (i) the neurons or layers that are arguments to the objective function and (ii) the neurons or layers that generate outputs on which the neurons that generate the arguments depend, either directly or indirectly.

The system need not train the network for the prediction goals in any particular order. In other words, the system can sequentially train for different goals with interspersed training data for different prediction goals. The system can also train for the different goals in parallel or concurrently.

The system optionally uses one of the prediction goals for the production system (630). In other words, although the system trained the network to make multiple different predictions for input sensor data, the system can optionally use only one of the predictions in practice. In some implementations, the system uses the auto-labeled full-vehicle prediction or the human-labeled full-vehicle prediction, but not both, in the production system. In other words, although the network was trained with vast amounts of auto-labeled training data, the system can use just a full-vehicle prediction that predicts how a human would have labeled the input sensor data.

Figure 8:
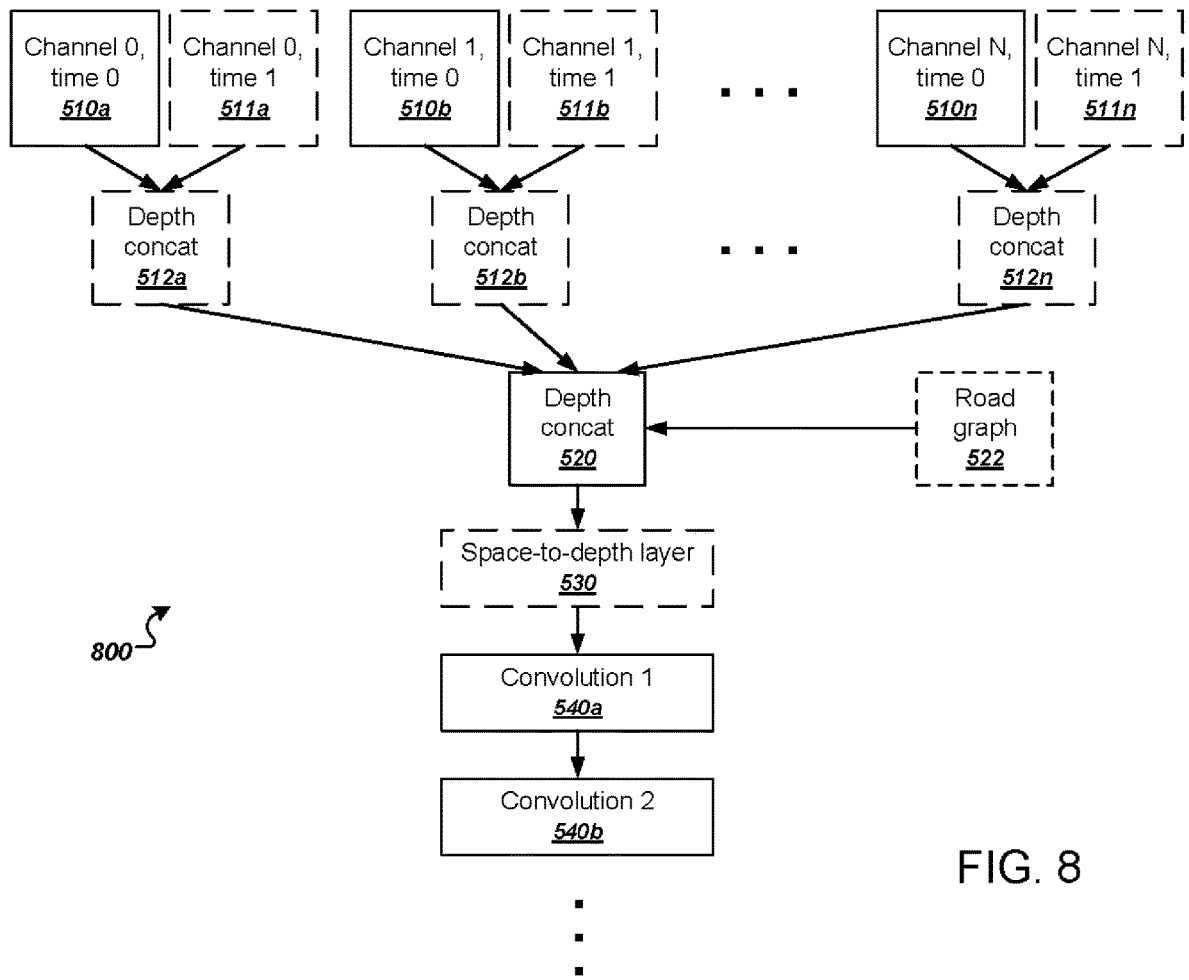
FIG. 8 illustrates an example architecture of a neural network that makes use of co-training techniques.
Figure 8:
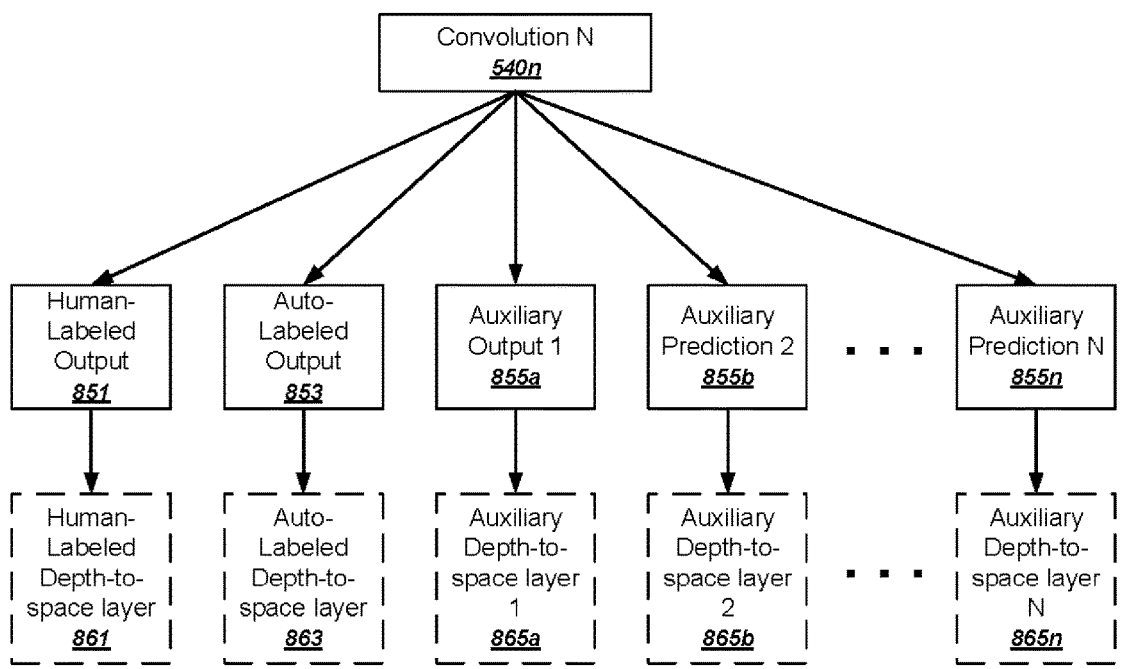

FIG. 8 illustrates an example architecture of a neural network 800 that makes use of co-training techniques. The network 800 shares many of the same components as the network 500. However, instead of having a single output, the network 800 has multiple distinct outputs. Each of the distinct outputs corresponds to a different prediction goal.

Although the multiple distinct outputs have different respective prediction goals, all of the outputs for the various prediction goals actually share the same input layers and convolutional layers.

The network 800 includes a human-labeled output layer 851. The human-labeled output layer 851 generates a prediction for how a human would identify objects in the projections of input sensor data. If the network 800 included a space-to-depth layer 530, the network 800 also includes a corresponding depth-to-space layer 861.

The network 800 also includes an auto-labeled output layer 853. The auto-labeled output layer 853 generates a prediction for how an on-board system would identify objects in the projections of input sensor data. If the network 800 included a space-to-depth layer 530, the network 800 also includes a corresponding depth-to-space layer 863.

As described above, during training the system would only generate a prediction using the human-labeled output layer for training data that was actually human-labeled. Conversely, for training data that was auto-labeled, the system would only generate a prediction using the auto-labeled output layer and not the human-labeled output layer.

However, when updating the parameter values during training, the system would update all of the convolutional layers 540*a-n* for both human-labeled training and auto-labeled training data.

FIG. 9 illustrates predictions for both human-labeled and auto-labeled training data. There are substantial differences between how a human would label projections of input sensor and how a production system would label projections of input sensor data. By using both together, the system can make a prediction network more robust and reliable.

Image 910 is a top-down projection of multiple channels of input sensor data for a particular road segment at a particular point in time. A row of parked cars along the right-hand side of image 910 is apparent from the top-down projection.

A prediction of how a production object prediction system would make full-vehicle predictions is shown in image 920. The predicted regions in image 920 correspond only to vehicles that are moving and do not include any of the parked cars. This is because auto-labeled training data generated by a production system may only label moving vehicles on the road.

On the other hand, image 930 illustrates the predicted regions that a human would have labeled. Image 930 illustrates that a human would be predicted to have labeled all of the parked cars along the right-hand side of the image.

As shown in FIG. 8, a system can further improve the robustness and reliability of the predictions by using one or more auxiliary output layers 855a-n. The auxiliary output layers 855a-n do not make object predictions, but rather make other predictions from projections of input sensor data. The predictions may, but need not, also relate to objects of the same class. For example, one of the auxiliary output layers can be an obstacle output layer that generates predictions for obstacles in general rather than vehicles in particular.

The network 800 can include any appropriate number of auxiliary output layers. For each auxiliary output layer, the system can use a separate collection of training data that matches the prediction goal of the auxiliary output layer. If the network 800 included a space-to-depth layer 530, the network 800 also includes a corresponding depth-to-space layers 865a-n for each of the auxiliary output layers 855a-n.

For example, the network 800 can include an edge detection output layer that generates predictions of only the edges of objects. The network 800 can also include a visible object parts output layer that generates predictions for only which parts of an object are visible from the on-board sensors of the vehicle.

FIG. 10 illustrates predictions for human-labeled training data, auto-labeled training data, and auxiliary training data. Image 1010 is a top-down projection of multiple channels of input sensor data.

From this input data, the system can generate the predictions 1020, 1030, 1040, and 1050. The image 1020 illustrates the predictions for how a production object prediction system would make full-vehicle predictions from the input sensor data. The image 1030 illustrates the predictions for how a human would make full-vehicle predictions from the input sensor data.

The image 1040 illustrates obstacle predictions generally rather than vehicle predictions. Thus, many more objects are indicated as predicted obstacles in the image 1040 than in the images 1020 and 1030.

The image 1050 illustrates vehicle edge predictions. The edge predictions as shown in the image 1050 essentially correspond to the full-vehicle predictions as shown in 1020 and 1030. However, the edge predictions are much more strongly informed by some input sensor channels than others. Thus, the trained network still receives an improvement in robustness, even though at first glance the edge predictions seem to correspond to the full-vehicle predictions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving sensor data representing one or more characteristics of electromagnetic radiation reflected off an environment surrounding a vehicle and captured by a first on-board sensor of the vehicle, wherein the sensor data comprises, for each of one or more directions around the vehicle, respective values for the one or more characteristics of the electromagnetic radiation captured by the first on-board sensor;
processing the sensor data to generate a top-down projection of the sensor data by one or more layers of a neural network configured to generate the top-down projection of the sensor data based on the sensor data, wherein the top-down projection comprises a mapping of the respective values for the one or more characteristics of the electromagnetic radiation onto a two-dimensional projection plane having a plurality of elements, wherein each element in the two-dimensional projection plane corresponds to a region of the environment surrounding the vehicle; and
processing a network input comprising the top-down projection using a convolutional neural network to generate an object prediction, wherein the object prediction characterizes, for each of a plurality of elements of a representation of the environment surrounding the vehicle, a respective likelihood that the region corresponding to the element is occupied by an object.

2. The computer-implemented method of claim 1, wherein the top-down projection comprises a plurality of top-down projections, wherein the two-dimensional projection plane comprises a plurality of two-dimensional projection planes, wherein each respective top-down projection of the plurality of top-down projections comprises a mapping of at least a subset of the respective values for the one or more characteristics of the electromagnetic radiation onto a corresponding two-dimensional projection plane of the plurality of two-dimensional projection planes, and wherein the corresponding two-dimensional projection plane of each respective top-down projection shares a common coordinate system.

3. The computer-implemented method of claim 2, wherein the first on-board sensor is a light detection and ranging (LIDAR) device, and wherein the one or more characteristics of electromagnetic radiation comprise a plurality of characteristics of electromagnetic radiation measured by the LIDAR device, and wherein each respective top-down projection of the plurality of top-down projections comprises a mapping of at least a subset of the respective values for the plurality of characteristics of the electromagnetic radiation onto the corresponding two-dimensional projection plane.

4. The computer-implemented method of claim 1, wherein the two-dimensional projection plane and the representation of the environment surrounding the vehicle share a common coordinate system.

5. The computer-implemented method of claim 1, wherein the respective values for the one or more characteristics of the electromagnetic radiation represent one or more of: (i) a distance between the first on-board sensor and an object in the environment, (ii) a direction from which the electromagnetic radiation was reflected, or (iii) an intensity of the electromagnetic radiation.

6. The computer-implemented method of claim 1, wherein the object prediction includes a respective likelihood for a region of the environment surrounding the vehicle that is unobservable from the first on-board sensor.

7. The computer-implemented method of claim 1, wherein the object prediction is represented by an output image, wherein the representation of the environment surrounding the vehicle is a two-dimensional output projection plane, wherein each element of the two-dimensional output projection plane corresponds to one or more pixels in the output image, and wherein the respective likelihood that the region corresponding to the element in the two-dimensional output projection plane is occupied by an object is represented by a respective color value of the corresponding one or more pixels in the output image.

8. The computer-implemented method of claim 1, wherein the one or more characteristics of electromagnetic radiation comprise a plurality of characteristics of electromagnetic radiation, wherein the sensor data comprises a plurality of channels, wherein each channel is based on different respective characteristics of the plurality of characteristics of electromagnetic radiation, wherein each channel of the plurality of channels comprises, for each of the one or more directions around the vehicle, respective values for the respective characteristics.

9. The computer-implemented method of claim 1, wherein generating the top-down projection of the sensor data comprises generating a respective top-down projection of the sensor data for each of multiple time slices.

10. The computer-implemented method of claim 1, wherein the convolutional neural network comprises:
a space-to-depth layer configured to stack groupings of two-dimensional input tensors representing the top-down projection of the sensor data into multiple three-dimensional depth slices;
a plurality of convolutional layers configured to process the multiple three-dimensional depth slices; and
a depth-to-space output layer configured to retransform an output of the plurality of convolutional layers into two-dimensional output tensors.

11. A system comprising:
one or more computers; and
one or more storage devices storing instructions that are operable, when executed by the one or more computers, to cause the one or more computers to perform operations comprising:
receiving sensor data representing one or more characteristics of electromagnetic radiation reflected off an environment surrounding a vehicle and captured by a first on-board sensor of the vehicle, wherein the sensor data comprises, for each of one or more directions around the vehicle, respective values for the one or more characteristics of the electromagnetic radiation captured by the first on-board sensor;
processing the sensor data to generate a top-down projection of the sensor data by one or more layers of a neural network configured to generate the top-down projection of the sensor data based on the sensor data, wherein the top-down projection comprises a mapping of the respective values for the one or more characteristics of the electromagnetic radiation onto a two-dimensional projection plane having a plurality of elements, wherein each element in the two-dimensional projection plane corresponds to a region of the environment surrounding the vehicle; and
processing a network input comprising the top-down projection using a convolutional neural network to generate an object prediction, wherein the object prediction characterizes, for each of a plurality of elements of a representation of the environment surrounding the vehicle, a respective likelihood that the region corresponding to the element is occupied by an object.

12. The system of claim 11, wherein the top-down projection comprises a plurality of top-down projections, wherein the two-dimensional projection plane comprises a plurality of two-dimensional projection planes, wherein each respective top-down projection of the plurality of top-down projections comprises a mapping of at least a subset of the respective values for the one or more characteristics of the electromagnetic radiation onto a corresponding two-dimensional projection plane of the plurality of two-dimensional projection planes, and wherein the corresponding two-dimensional projection plane of each respective top-down projection shares a common coordinate system.

13. The system of claim 12, wherein the first on-board sensor is a light detection and ranging (LIDAR) device, and wherein the one or more characteristics of electromagnetic radiation comprise a plurality of characteristics of electromagnetic radiation measured by the LIDAR device, and wherein each respective top-down projection of the plurality of top-down projections comprises a mapping of at least a subset of the respective values for the plurality of characteristics of the electromagnetic radiation onto the corresponding two-dimensional projection plane.

14. The system of claim 11, wherein the two-dimensional projection plane and the representation of the environment surrounding the vehicle share a common coordinate system.

15. The system of claim 11, wherein the respective values for the one or more characteristics of the electromagnetic radiation represent one or more of: (i) a distance between the first on-board sensor and an object in the environment, (ii) a direction from which the electromagnetic radiation was reflected, or (iii) an intensity of the electromagnetic radiation.

16. The system of claim 11, wherein the object prediction includes a respective likelihood for a region of the environment surrounding the vehicle that is unobservable from the first on-board sensor.

17. A computer program product, encoded on one or more non-transitory computer storage media, comprising instructions that, when executed by one or more computers, cause the one or more computers to perform operations comprising:
receiving sensor data representing one or more characteristics of electromagnetic radiation reflected off an environment surrounding a vehicle and captured by a first on-board sensor of the vehicle, wherein the sensor data comprises, for each of one or more directions around the vehicle, respective values for the one or more characteristics of the electromagnetic radiation captured by the first on-board sensor;

processing the sensor data to generate a top-down projection of the sensor data by one or more layers of a neural network configured to generate the top-down projection of the sensor data based on the sensor data, wherein the top-down projection comprises a mapping of the respective values for the one or more characteristics of the electromagnetic radiation onto a two-dimensional projection plane having a plurality of elements, wherein each element in the two-dimensional projection plane corresponds to a region of the environment surrounding the vehicle; and processing a network input comprising the top-down projection using a convolutional neural network to generate an object prediction, wherein the object prediction characterizes, for each of a plurality of elements of a representation of the environment surrounding the vehicle, a respective likelihood that the region corresponding to the element is occupied by an object.

18. The computer program product of claim 17, wherein the top-down projection comprises a plurality of top-down projections, wherein the two-dimensional projection plane comprises a plurality of two-dimensional projection planes, wherein each respective top-down projection of the plurality of top-down projections comprises a mapping of at least a subset of the respective values for the one or more characteristics of the electromagnetic radiation onto a corresponding two-dimensional projection plane of the plurality of two-dimensional projection planes, and wherein the corresponding two-dimensional projection plane of each respective top-down projection shares a common coordinate system.

19. The computer program product of claim 18, wherein the first on-board sensor is a light detection and ranging (LIDAR) device, and wherein the one or more characteristics of electromagnetic radiation comprise a plurality of characteristics of electromagnetic radiation measured by the LIDAR device, and wherein each respective top-down projection of the plurality of top-down projections comprises a mapping of at least a subset of the respective values for the plurality of characteristics of the electromagnetic radiation onto the corresponding two-dimensional projection plane.

20. The computer program product of claim 17, wherein the two-dimensional projection plane and the representation of the environment surrounding the vehicle share a common coordinate system.

* * * * *